(12) United States Patent
Vokey et al.

(10) Patent No.: US 10,352,047 B2
(45) Date of Patent: Jul. 16, 2019

(54) METHOD OF LOCATING A LEAK SITE IN ROOF MEMBRANES USING LENGTHS OF MOISTURE DETECTION TAPE SET OUT IN ZONES

(71) Applicant: Detec Systems LLC, Bellingham, WA (US)

(72) Inventors: David Vokey, Sidney (CA); Chad James Herrick, Bellingham, WA (US)

(73) Assignee: Detec Systems LLC, Bellingham, WA (US)

( * ) Notice: Subject to any disclaimer, the term of this patent is extended or adjusted under 35 U.S.C. 154(b) by 0 days.

(21) Appl. No.: 15/406,309

(22) Filed: Jan. 13, 2017

(65) Prior Publication Data

US 2018/0202163 A1    Jul. 19, 2018

(51) Int. Cl.
  *G01M 3/16*  (2006.01)
  *E04D 13/00*  (2006.01)
  *G01D 5/165*  (2006.01)

(52) U.S. Cl.
  CPC .......... *E04D 13/006* (2013.01); *G01D 5/165* (2013.01); *G01M 3/165* (2013.01)

(58) Field of Classification Search
  CPC ...... E04D 13/006; G01D 5/165; G01M 3/165
  USPC .................................................. 324/694–696
  See application file for complete search history.

(56) References Cited

U.S. PATENT DOCUMENTS

| 4,317,996 | A | * | 3/1982 | Davis | G01M 3/20 250/302 |
|---|---|---|---|---|---|
| 4,965,554 | A | * | 10/1990 | Darling | E04D 13/006 324/557 |
| 5,081,422 | A | * | 1/1992 | Shih | E04D 13/006 324/693 |
| 5,341,128 | A | * | 8/1994 | Keyser | G01M 3/045 174/11 R |
| 6,175,310 | B1 | * | 1/2001 | Gott | G01M 3/165 340/604 |
| 7,652,481 | B2 | * | 1/2010 | Vokey | G01M 3/165 324/326 |
| 7,768,412 | B2 | * | 8/2010 | Vokey | G08B 21/20 340/521 |
| 8,319,508 | B2 | * | 11/2012 | Vokey | C23F 13/02 324/522 |
| 9,157,828 | B2 | * | 10/2015 | Jaman | G01N 27/048 |
| 2007/0046481 | A1 | * | 3/2007 | Vokey | E04D 13/006 340/602 |

(Continued)

*Primary Examiner* — Jay Patidar
(74) *Attorney, Agent, or Firm* — Adrian D. Battison; Ade & Company Inc.; Ryan W. Dupuis

(57) ABSTRACT

Leaks in a roof membrane are detected in plurality of separate zones arranged in rows and columns. By applying to the roof in a location underneath the membrane and on top of the deck in each zone at least one length of a moisture detection sensor comprising a substrate carrying two parallel conductors on one surface of the substrate detecting changes in resistance between the conductors so as to detect moisture permeating into the respective zone. The moisture detecting sensors are separate in each zone so as to detect changes in resistance in the respective zone independent of any changes in resistance in other zones so that the system can detect within the rows and columns any zone where changes in resistance occur. In order to detect across the zone, the sensor is applied in a two dimensional pattern for example by two lengths at right angles.

9 Claims, 3 Drawing Sheets

(56) References Cited

U.S. PATENT DOCUMENTS

2009/0044595 A1* 2/2009 Vokey .................. G01M 3/165
73/1.17
2017/0205308 A1* 7/2017 Wassarman ............... E04B 1/92

\* cited by examiner

METHOD OF LOCATING A LEAK SITE IN ROOF MEMBRANES USING LENGTHS OF MOISTURE DETECTION TAPE SET OUT IN ZONES

The present invention relates to a system for monitoring moisture intrusion in roofing and waterproofing systems for the presence and location of moisture penetration. It has particular application to monitoring low-slope and flat roofs of residential and commercial buildings for undesired water ingress.

The invention may provide detection of moisture ingress through low slope roofing and waterproofing membranes from two different transport phenomena; physical mass transfer of water through breaches in the membrane and water vapor mass transfer created by temperature and relative humidity gradients. The invention is capable of identifying the presence and location of water in the liquid state which has passed through the waterproofing membrane into the building envelope.

BACKGROUND OF THE INVENTION

The failure to detect, find and correct minor roof deterioration in the earliest stages is considered the greatest cause of premature roof failure. This is particularly true of roofing materials applied on low-slope or flat roofs. Costly roofing problems are often the result of design deficiencies or faulty application of the roof system. Even when properly designed and applied, all roofing materials deteriorate from exposure to the weather at rates determined largely by the kind of material and the conditions of exposure.

The failure to detect water accumulation, locate the source of water ingress and perform proper repairs in early stages is considered the greatest cause of premature roof failure. Low slope roofing systems are vulnerable to undetected moisture ingress for three reasons:
- a—Hydrostatic pressure on top of membrane from low structural sloping.
- b—Difficulty identifying trade damage and defects during construction.
- c—Presence of a vapor barrier at the bottom of the roofing system assembly.

If trade damage and defects in the membrane are not identified and corrected during construction water can ingress into the rigid insulation and accumulate on the vapor barrier. Because the vapor barrier is impermeable water ingress into occupied spaces of the building does not occur causing undetected water accumulation for extended periods of time. Undetected water accumulation can lead to; structural deterioration of buildings, negative impacts to building occupants from mold growth and creation of favorable environments for pests. Water ingress must be identified and repaired to prevent damages from water accumulation.

Water ingress detection systems have been developed to locate and repair roof leaks before damages become irreversible. The detection systems are installed on the vapor barrier so that water ingress from defects in the membrane, water vapor mass transport and defective roof accessories can be detected. By installing a leak detection system on the vapor barrier locating the source of the water ingress can be difficult due to lateral movement of the water as it passes through joints in the cover board and rigid insulation. The detection system must locate any membrane breach through the membrane and intervening layers to the vapor barrier or deck surface.

Several methods have been used to try and locate roof leaks after they have occurred. Precisely locating defects and or breaches the becomes a particular problem for conventional roofing systems where the roof membrane is located at the top of the assembly and any leak detection system is placed below the membrane on top of a vapor barrier above the structural deck. The detection system must then locate any membrane breach through the membrane and intervening layers to the vapor barrier or deck surface.

A roof leak monitoring system is detailed in U.S. Pat. No. 7,652,481 (Vokey) issued Jan. 26, 2010 to Detec Systems LLC discloses an arrangement for leak detection on flat roof systems using a gridded system of wire sensors whereby the X and Y wires that form a grid are alternately operated as an electric guard and then as a leak detection sensor measuring the conductivity to ground at a membrane breach through the water on the surface of the membrane. Although fundamentally different in its detection measurement, the method relies on the assumption that a breach through the membrane will be located coincidentally at an intersection of the x and y wires of the common grid section. However, where there are two breaches including a first breach close to an x grid location only and a second breach at a location next to a y grid location only can, the analysis of the voltages can result in an incorrect assessment that there is a single breach in the grid sections where the x and y wires of the grid intersect.

An improvement to this arrangement is also shown in U.S. Pat. No. 8,319,508 (Vokey) issued Nov. 27 2012.

A yet further improvement is shown in Published US application 2014/0361796 which shows that, where a roof deck is used which has no or low electrical conductivity, a measurement system can be provided where the current is detected between a sensor on top of the membrane and a conductive layer underneath the membrane connecting the deck to the membrane such as an adhesive.

The disclosure of the above Vokey patents may be referred to for further details of the subject matter claimed herein.

SUMMARY OF THE INVENTION

The object of the present invention is to provide a method for monitoring leaks in flat or low slope roofing and waterproofing systems which have an impermeable membrane applied at the top most layer of the assembly.

According to the invention there is a method of detecting a leak in a roof, wherein the roof comprises a generally horizontal roof support deck with a water impermeable membrane applied above an upper surface of the support deck, the method comprising:

dividing the membrane into a plurality of separate zones arranged side by side in rows and columns;

in each zone applying to the roof in a location underneath the membrane and on top of the deck at least one length of a moisture detection sensor arranged to detect moisture in between the deck and the membrane;

the moisture detection sensor comprising a substrate of a dielectric material carrying first and second elongate, parallel, conductors secured to one surface of the substrate;

said at least one length being arranged in a two-dimensional pattern in the zone;

detecting by a sensing system changes in resistance between said first and second conductors of said at least one length so as to detect moisture permeating into the respective zone in the location between the membrane and the roof deck;

detecting said changes in resistance in the respective zone independent of any changes in resistance of said at least one length in other zones;

and identifying within said rows and columns any zone where changes in resistance occur indicative of moisture permeating into that zone.

In one preferred arrangement, the sensing length in each zone is electrically separated from the sensing length of each of the other zones.

In one preferred arrangement, the length comprises at least first and second lengths arranged to lie in different directions in the zone where preferably the first length is arranged at an angle, typically a right angle, to the second length.

In one preferred arrangement, the first and second lengths cross and the first conductor of the first length is connected to the first conductor of the second length for common connection to said sensing system and the second conductor of the first length is connected to the second conductor of the second length for common connection to the sensing system.

Preferably the first conductor of the first length is connected to the first conductor of the second length at a crossing point and the second conductor of the first length is connected to the second conductor of the second length at a crossing point.

In one preferred arrangement, the zones are rectangular and each of the first and second lengths spans across the zone passing substantially through a center of the zone, either diagonally or parallel to sides of the zone.

In one preferred arrangement, the length is in contact with insulation material between the deck and the membrane so as to detect moisture permeating in the insulation material.

In one preferred arrangement, the length or lengths are arranged underneath the insulation material and the conductors are on a top surface of the substrate. Preferably there is a vapor barrier on top of the deck and underneath the insulation material.

Preferably the sensor includes a protective layer of water pervious material secured to the top surface of the substrate and extending over the conductors and there is provided a mounting adhesive on a surface of the substrate opposite to the conductors.

Preferably the substrate is an elongate tape, the conductors extend along the tape and each of the conductors is a flat metal strip.

In one preferred arrangement, the method includes operating switches in sequence to measure and record the resistance from the conductors in each zone sequentially.

Preferably a resistor is provided across one or both of the sensing conductors to ensure continuity of the circuit where the resistance value is substantially higher that the expected parallel value of the combination when moisture crossed the sensor.

Thus the arrangement described in detail herein provides a method of detecting a leak in a roof where a typical roof comprises a generally horizontal roof support deck, a vapor barrier, thermal insulation, protection board and a water impermeable membrane applied onto the upper surface of the roof assembly. The membrane may be loose laid, mechanically attached or fully adhered.

Thus the arrangement described in detail herein provides a leak detection system by applied a pair of electrically conductive sensing elements on the surface of the vapor barrier or roof deck in an individually zoned cross grid zone detection pattern so as to be in electrical communication with any moisture that reaches the lower roof assembly. Using moisture detection tape with two flat conductors, the X and Y grids are divided into individual sensing sections at the midpoint of each grid section with a cable pair connecting to the X and Y detection conductors at each X and Y intersection. The cable pair connects the detection conductors to the measurement system. Every individual cross grid detection zone is assigned an input on the measurement system. Because each cross grid detection zone now being individually sensed, the potential for leak location ambiguity is avoided.

The measurement system, on remote command, takes readings from the X and Y zones and forwards the readings preferably via an internet gateway to a cloud based monitoring center for analysis. The individual grid sections are measured time stamped and logged with the resultant readings mapped onto an as-built drawing of the roof assembly. A color-coded map can be overlaid on the drawing of the building to provide an intuitive overview of the roof condition. If a leak occurs, stored measurements can be used to determine the location of the first zone that went into alarm.

BRIEF DESCRIPTION OF THE DRAWINGS

One embodiment of the invention will now be described in conjunction with the accompanying drawings in which.

DETAILED DESCRIPTION OF THE INVENTION

Figure 1:
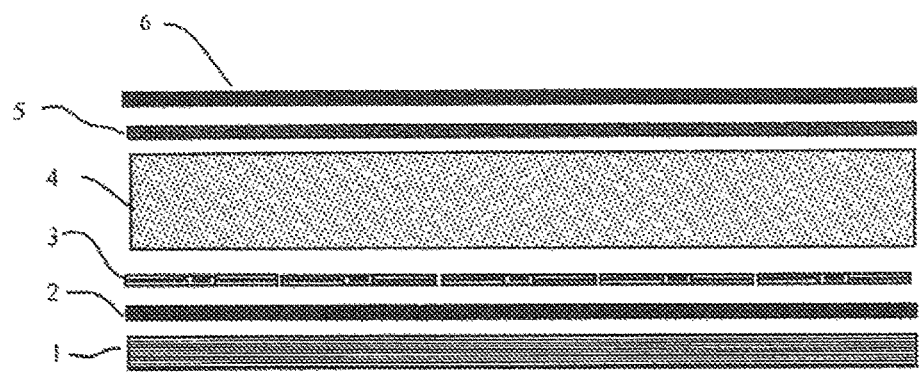
FIG. 1 is an exploded schematic cross-sectional view of a typical conventional roof assembly

Referring now to the drawings, a cross-sectional view of a typical conventional roof assembly is shown in FIG. 1. The structural deck 1 which supports the rest of the roof assembly is covered with a vapor barrier 2. Placed immediately above and on top of the vapor barrier is the moisture detection system detection conductors 3 in a zoned X and Y configuration shown best in FIG. 3. Thermal insulation 4 is installed above the vapor barrier then a protection board 5 is installed above the thermal insulation 4. The water impervious membrane 6 is then installed on top of the protection board to complete the assembly. The detection system is placed on top of the vapor barrier as this is where any moisture will tend to migrate to.

Figure 2:
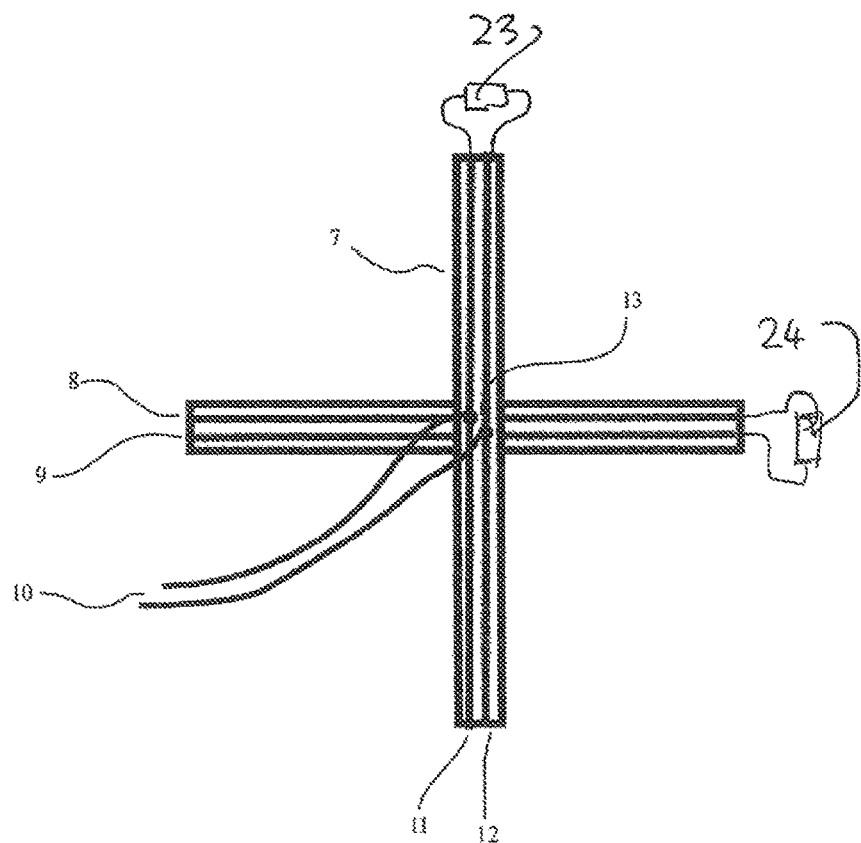
FIG. 2 is an illustration of an X and Y sensor zone using detection tape with two flat conductors joined at the intersection of the tapes

Referring to FIG. 2, an X and Y detection zone using moisture detection tape with flat conductors is shown. The detection tape 7 is placed in the roof assembly in a cross configuration the tip conductors 8, 11 and the ring conductors 9, 12 are spliced together at the tape intersection 13 along with the cable pair 10 that connects to the zone switch 18. The length of the detection tape 7 defines the grid spacing for the detection system. The shorter the tape section the tighter the zoned grid pattern which subsequently increases the sensitivity and leak location resolution of the system.

Figure 3:
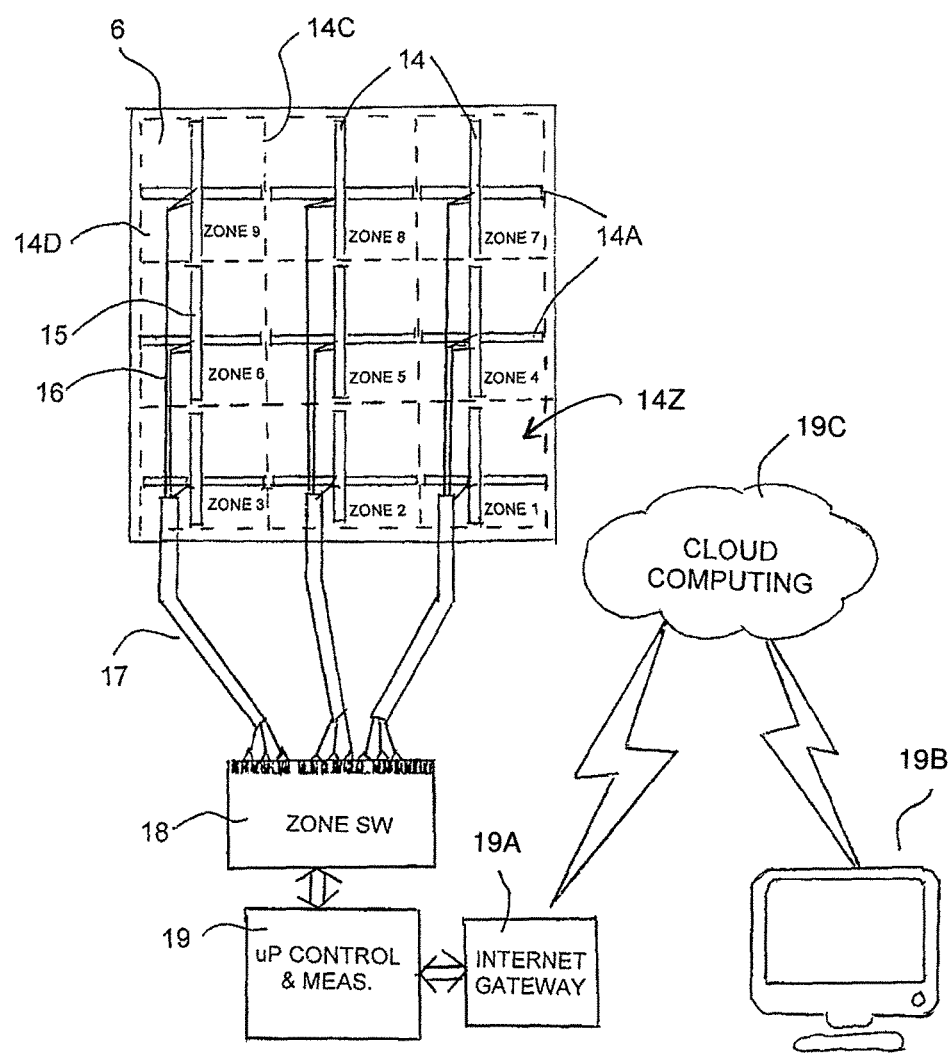
FIG. 3 is a circuit schematic showing the measuring and control circuit for multiple zones and shows the microprocessor controlled switching arrangement and internet gateway linking the system to a cloud based monitoring center.

FIG. 3 provides a simple schematic illustrating the zone configuration and wiring connection along with a block diagram if the measurement system and internet connection. A vertical view of a roof vapor barrier 6 is shown. The X and Y detection zones 14, are placed directly on the vapor barrier. The tip and ring detection tape conductors are connected together along with the zone connecting pair at the tape intersection 15. The zone connecting cable 17 terminates the zone pairs on the zone switching circuit 18. On command from the cloud based monitoring center (CBMC) 19C from a remote terminal 19B via the Internet gateway 19A the controller and measurement circuit 19 will initiate a measurement cycle. The X and Y detection zones 14Z are measured in sequence and the resultant measurement stored in memory at the microprocessor control and measurement circuit 19. The (CBMC) 19C with then retrieve the measured values for analysis. If a leak occurs, the stored measurements are reviewed to determine the particular location of the first zone that went into alarm so as to locate the leak, even if moisture movement later masks the specific location.

The sensor tape 14 is of laminated construction with the preferred configuration having substrate 20B of high-dielectric strength and two flat copper conductors 11, 12 adhered to the dielectric substrate 20B. The high-dielectric strength substrate provides mechanical strength and electrical insulation from the surface it is applied to. The substrate is coated with a pressure sensitive mounting adhesive 21A that provides adequate adhesion to standard building materials such as wood, wood laminates, concrete, steel, galvanized steel, PVC, ceramic, etc for attachment to the vapor barrier 2. The adhesive backing is desirably non-water soluble and selected to provide good adhesion characteristics over the anticipated application temperature range, e.g. $-10°$ C. to $+50°$ C. The adhesive backing is protected prior to installation by a peel-off release layer (not shown). A protective non-hygroscopic dielectric layer, 22A over the conductors provides mechanical and insulating properties such that contact with metal surfaces does not cause a short circuit across the conductors while allowing water to penetrate to the conductor surfaces and bridge the gap between the conductors. The sensor tape 14A symmetrically comprises a substrate 20A of high-dielectric strength and two flat copper conductors 8, 9 adhered to the dielectric substrate 20A again covered by a protective layer 22 and including a bottom adhesive layer 21.

The conductors are preferably flat metal strips typically no less than 6.5 mm wide and spaced apart by a distance no less than 13 mm, preferably 13.6 mm.

FIG. 3 demonstrates a cross grid detection zone using moisture detection tape with flat conductors is shown. The detection tape is placed in the roof assembly in in a cross configuration, see FIG. 3 for layout of multiple cross grid detection zones. It will be noted that the two sensing tapes 14 and 14A are arranged at right angles and intersect at the middle of the zone.

Figure 5:
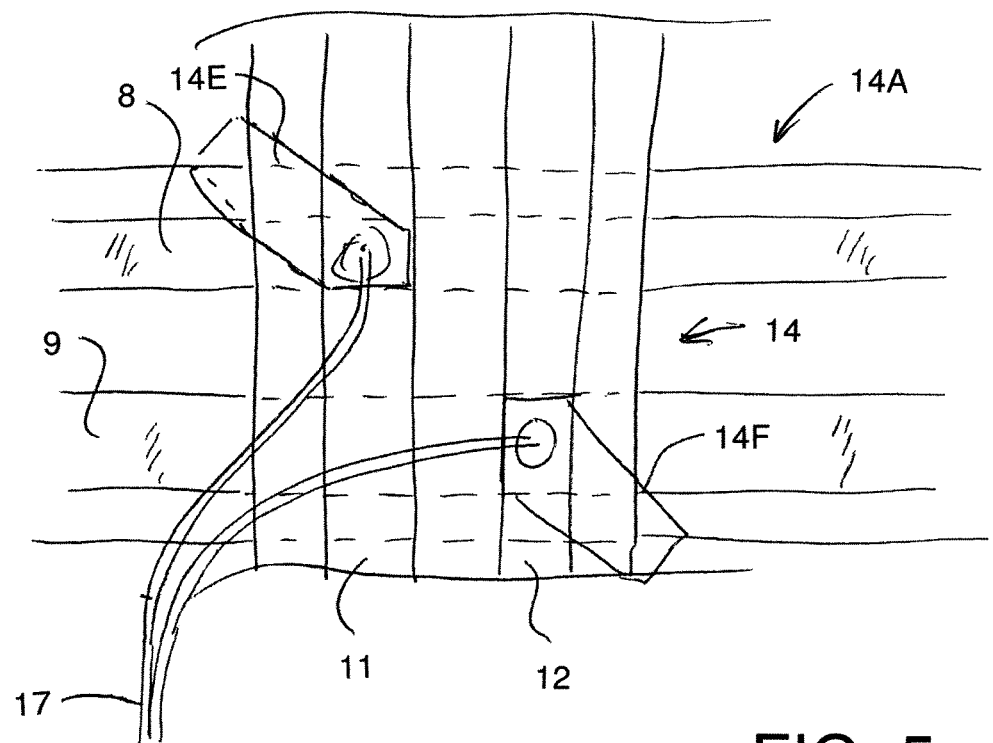
FIG. 5 is a top plan view at the connection between two lengths of the moisture sensing tape at the cross-over within one zone.
Figure 4:
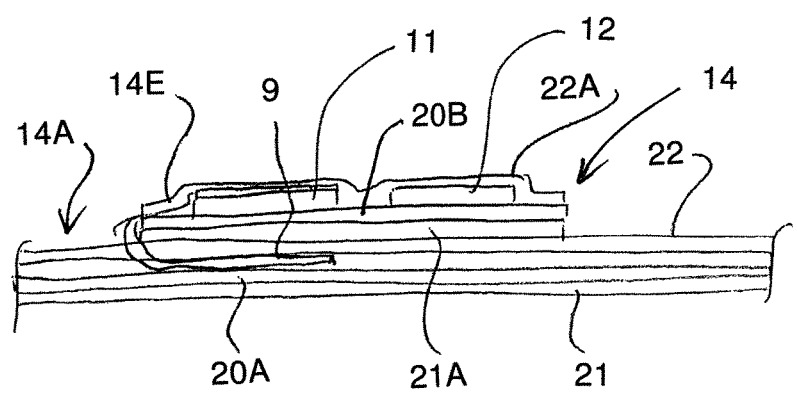
FIG. 4 is a cross-sectional view at the connection between two lengths of the moisture sensing tape at the cross-over within one zone.

As best shown in FIGS. 4 and 5, the conductors 8 and 11 are connected at the cross-over point by a splice connector 14E which is U-shaped and is inserted into the tapes at the conductors to provide a connection to each. Similarly a connector 14F connects the conductors 9 and 12. Connectors of this type which can be inserted a crimped to the conductors are commercially available. The conductors in each zone are separated each from the next at the separation lines 14C, 14D defining the edges of the zones. The tip conductors and the ring conductors are spliced at the cable pair connections at connectors 14E, 14F along with the cable pair 17 that connects to the zone switch. The length of each detection tape 14, 14A defines the grid spacing for the detection system. The shorter the tape section the tighter the zoned grid pattern.

In another embodiment, a loop back test to verify circuit continuity can be implemented by placing termination resistors 23, 24 at the end of the detection tape circuit. The control and measurement module 19 can be switched remotely to test for circuit continuity with an expected value of the parallel combination of the termination resistors 23,24.

The invention claimed is:

1. A method of detecting a leak site in a roof, wherein the roof comprises a generally horizontal roof support deck with a water impermeable membrane applied above an upper surface of the support deck, the method comprising:
dividing the membrane into a plurality of separate zones arranged side by side in rows and columns;
in each zone applying to the roof in a location underneath the membrane and on top of the deck a moisture detection sensor arranged to detect moisture in between the deck and the membrane;
the moisture detection sensor in each zone comprising at least first and second lengths of a substrate strip of a dielectric material carrying first and second elongate, parallel, conductors where the conductors are arranged longitudinally of the substrate strip and secured to one surface of the substrate strip;
said first and second lengths of each moisture detection sensor being laid at an angle to one another so as to cross at a crossing point therebetween so that said first and second lengths of each moisture detection sensor are arranged in a two dimensional pattern in the zone;
connecting the first conductor of the first length to the first conductor of the second length at the crossing point and connecting the second conductor of the first length to the second conductor of the second length at the crossing point;
for each respective zone, detecting by a sensing system changes in resistance between said first and second conductors of the moisture detection sensor of the respective zone so as to detect moisture permeating into the respective zone;
the moisture detection sensor of each respective zone being located wholly within the respective zone so as to be responsive to moisture only within the respective zone and not to moisture in others of the zones;
and identifying within said rows and columns any one of said zones where changes in resistance occur indicative of moisture permeating into said one of said zones so as to locate the leak site on the roof.

2. The method according to claim 1 wherein the first and second lengths are arranged at a right angle.

3. The method according to claim 1 wherein the zones are rectangular and each of the first and second lengths spans across the zone passing substantially through a center of the zone.

4. The method according to claim 1 wherein said first and second lengths are in contact with insulation material between the deck and the membrane so as to detect moisture permeating in the insulation material.

5. The method according to claim 4 wherein said first and second lengths are underneath the insulation material and the conductors are on a top surface of the substrate.

6. The method according to claim 4 wherein there is a vapor barrier on top of the deck and underneath the insulation material.

7. The method according to claim 1 wherein there is provided a protective layer of water pervious material secured to the top surface of the substrate and extending over the conductors.

8. The method according to claim 1 wherein there is provided a mounting adhesive on a surface of the substrate opposite to the conductors.

9. The method according to claim 1 wherein each of the conductors is a flat metal strip.

* * * * *